United States Patent
Wistendahl et al.

(10) Patent No.: US 6,496,981 B1
(45) Date of Patent: Dec. 17, 2002

(54) SYSTEM FOR CONVERTING MEDIA CONTENT FOR INTERACTIVE TV USE

(76) Inventors: Douglass A. Wistendahl, 99 Elm St., Greenwich, CT (US) 06830; Leighton K. Chong, 133 Kaai St., Honolulu, HI (US) 96821

(*) Notice: Subject to any disclaimer, the term of this patent is extended or adjusted under 35 U.S.C. 154(b) by 0 days.

(21) Appl. No.: 08/933,666

(22) Filed: Sep. 19, 1997

Related U.S. Application Data

(63) Continuation-in-part of application No. 08/536,107, filed as application No. PCT/US96/15437 on Sep. 26, 1996, now Pat. No. 5,708,845.

(51) Int. Cl.$^7$ ............... H04N 7/10; H04N 7/173; G09G 5/00
(52) U.S. Cl. ............... 725/112; 725/61; 345/731; 345/619
(58) Field of Search ............... 725/39, 40, 43, 725/44, 46, 47, 51, 52, 112, 113; 345/619, 723, 731, 738, 762, 763, 764; H04N 7/10, 7/04

(56) References Cited

U.S. PATENT DOCUMENTS

| | | | |
|---|---|---|---|
| 5,065,345 A | * 11/1991 | Knowles et al. | 395/154 |
| 5,109,482 A | * 4/1992 | Gibson | 395/154 |
| 5,204,947 A | * 4/1993 | Bernstein et al. | 395/157 |
| 5,319,455 A | * 6/1994 | Hoarty et al. | 348/7 |
| 5,393,073 A | 2/1995 | Best | |
| 5,422,674 A | * 6/1995 | Hooper et al. | 358/3 |
| 5,442,390 A | 8/1995 | Hooper | |
| 5,453,779 A | 9/1995 | Dan | |
| 5,461,415 A | 10/1995 | Wolf | |
| 5,524,195 A | * 6/1996 | Clanton, III et al. | 725/39 |

(List continued on next page.)

OTHER PUBLICATIONS

ASSET–2 Publication, additional pages entitled Real–Time Implementation of ASSET–2, U.K. Defense Research Agency, 1995.

(List continued on next page.)

*Primary Examiner*—Bhavesh Menta
*Assistant Examiner*—Vivek Srivastava
(74) *Attorney, Agent, or Firm*—Ostrager Chong & Flaherty (Hawaii)

(57) ABSTRACT

A system for allowing media content to be used as an interactive media program comprises: (a) media content in the form of successive image display frames indexed in a time sequence; (b) object mapping data specifying the locations of objects appearing in the display of media content which are to be rendered interactive; (c) linkages provided through an associated interactive media program from the objects specified by the object mapping data to interactive functions to be performed upon selection of the objects in the display; and (d) a user system for operating the interactive media program in conjunction with the display of the media content by selecting an object appearing in an image display frame and performing the interactive function linked thereto. The invention includes an authoring system for generating the object mapping data for the media content. In a preferred interactive TV system, media content, in the form of movies, TV programs, advertising, and the like, can be presented as interactive media programs by transmitting the TV content with object mapping data ("hot spots") to a set top box connected to a viewer's TV. The TV set top box has a utility stored therein for performing the interactive functions linked to the defined hot spots in the TV content upon user selection. Interactive TV programs can also be presented using a conventional TV set top box and remote control in conjunction with the current analog video content. For example, the analog video content may be transmitted to the viewer on a channel provided by a cable TV company, with the object mapping data and program linkages for interactive functions transmitted in the video blanking intervals (VBI) interleaved with the video frames.

16 Claims, 7 Drawing Sheets

U.S. PATENT DOCUMENTS

| | | | |
|---|---|---|---|
| 5,528,513 A | | 6/1996 | Vaitzblit |
| 5,539,871 A | * | 7/1996 | Gibson ........................ 395/154 |
| 5,596,705 A | | 1/1997 | Reimer et al. |
| 5,684,715 A | * | 11/1997 | Palmer ........................ 345/157 |
| 5,822,123 A | * | 10/1998 | Davis et al. ................. 348/564 |
| 5,838,906 A | * | 11/1998 | Doyle et al. ................. 345/738 |
| 5,969,715 A | * | 10/1999 | Dougherty et al. ......... 345/327 |
| 6,020,885 A | * | 2/2000 | Honda ......................... 345/332 |
| 6,233,734 B1 | * | 5/2001 | Macrae et al. ................. 725/50 |
| 6,295,055 B1 | * | 9/2001 | Miller et al. ................. 345/326 |

OTHER PUBLICATIONS

"Interactive Television", W. Hodge, Mc–Graw–Hill, 1995, Table of Contents, pp. 13–19, 153–160.

Elastic Reality software, ad from B&H Photo–Video catalog, and attached pages from Chs. 7, 11, and 12 of manual. Tracy Valleau's LinksWare, marketing material on LinksWare software, dated Jul. 1, 1995, from tracy@linksware.com.

ASSET–2 Motion Segmentation and Object Tracking System, introduction and overview, publ. by Defense Research Agency, U.K.

"AVI Files With Hotspots", David A. Feinleib, Aug. 4, 1993, Microsoft Corp., publ. in Development Library CD–ROM, Microsoft Developers' Network, 1994.

"Multimedia Hypervideo Links for Full Motion Video". IBM Technical Disclosure Bulletin, vol. 37, No. 04A, Apr. 1994.

"Comprehensive guide for Multimedia Technologists", W. Hodges, Ch. 1, 2, and 11, publ. McGraw–Hill, 1995.

"Time–varying Sensitive Regions in Dynamic Multimedia Objects", V. Burril et al., Information and Software Technology, vol. 36, No. 4, pp. 21–223, publ. Butterworth–Heinemann Ltd., 1994.

* cited by examiner

FIG. 7A
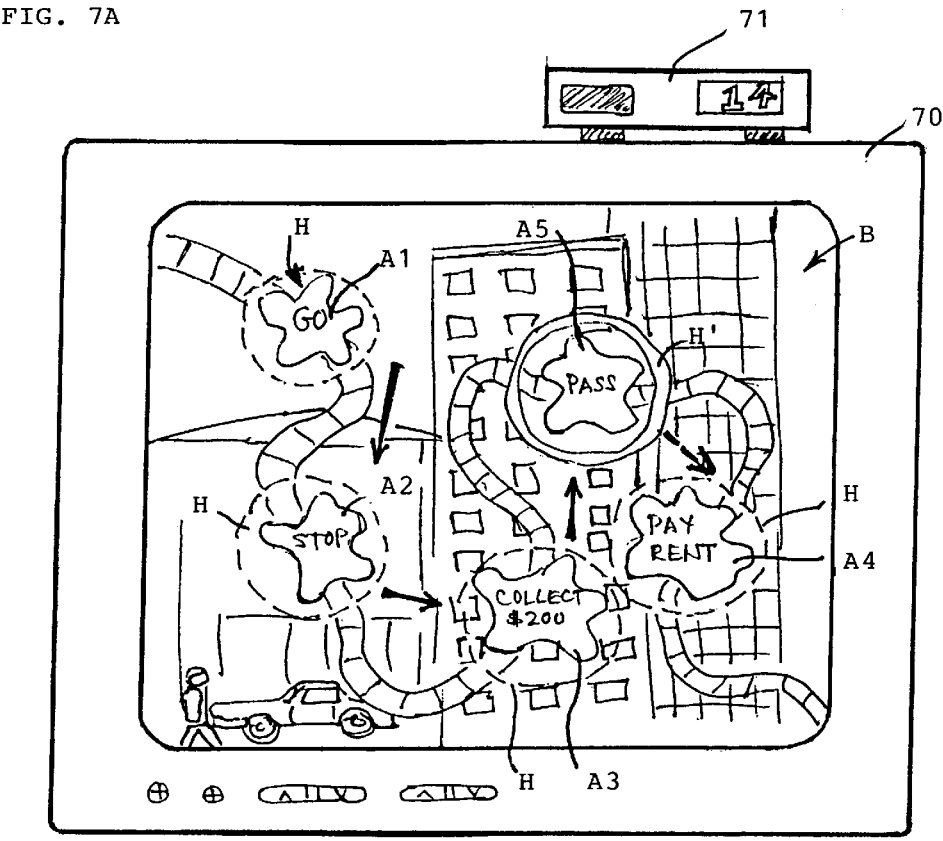
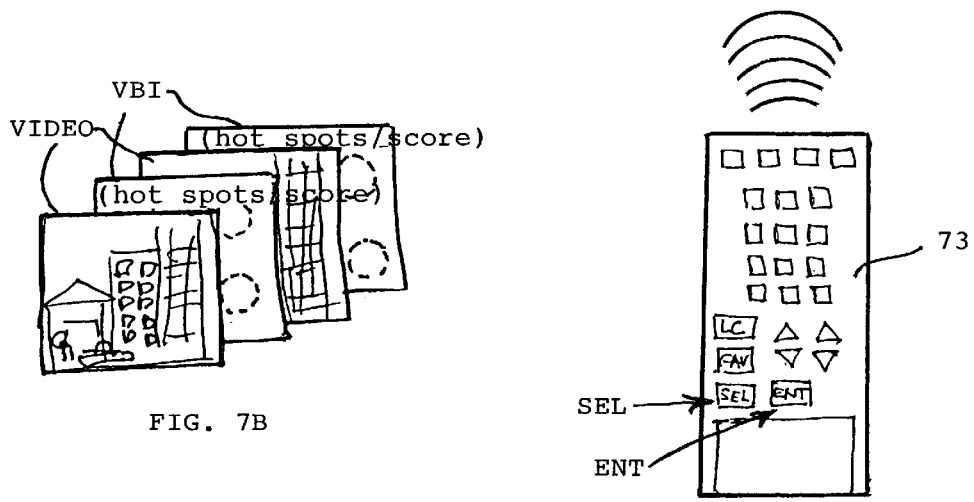
FIG. 7B

SYSTEM FOR CONVERTING MEDIA CONTENT FOR INTERACTIVE TV USE

This patent application is a continuation-in-part from and claims the benefit of priority under 35 United States Code, Section 102, of copending U.S. patent application Ser. No. 08/536,107 filed on Sep. 29, 1995, now U.S. Pat. No. 5,708,845 and PCT International Application 96/15437 designating the United States filed on Sep. 26, 1996.

FIELD OF THE INVENTION

This invention relates to the field of interactive media systems, and particularly to a system for converting media content for interactive TV use.

BACKGROUND ART

Technological development is fostering an increasing convergence of television, multimedia programming, and computers. The creation of a world-wide information infrastructure will support the viewing of motion pictures, multimedia programs, and newscast events on demand. It will provide access to telecommunications networks, databases, and information services over long distances, as well as facilitate the instantaneous exchanging of governmental, business, research, institutional, medical, and personal data, and teleconferencing and sharing of documents and information among organizations, workgroups, and individuals spread out over wide areas. The entry point for users to this information infrastructure is principally the interactive use of a visual display interface to the system.

Content is essential to the value users derive from use of the system. While much of the content being offered is newly created to take advantage of the latest developments in technology, there is a vast base of existing content that is non-interactive which users may desire to have access to, particularly media content in the form of movies, videos, video advertising, television programming, etc. However, if existing media content is merely offered as a digitized equivalent of its existing form, then there is little or no value added over obtaining the same content through the current media in which it is offered. The conversion of existing media content to interactive digital media adds value by rendering it capable of interactivity and linking to other forms of digital media.

The conversion of media content to interactive digital media use has heretofore been a laborious process as conversion tools have required developers to perform conversion tasks essentially manually. Many types of hyperlinking tools have been developed for rendering text and graphics materials "live" for interactive use, e.g., as discussed in Multimedia and Hypertext, edited by Jakob Nielson, published by Academic Press, Inc., 1995. Typically, a link is created between a word, phrase, icon, image, or other object appearing in the display to another text file (hypertext) or to another program or media function (hypermedia) to deepen the user's engagement in the system. Thus, when a user clicks with a pointing device such as a mouse on an object appearing in the screen display, an interactive media program will pull up another file or perform another function so as to provide the user with further information, response, or options. A series of hyperlinks may be followed to allow the user to pursue a subject to any desired depth or relational complexity. Such hyperlinking tools have found valuable use for online documentation, user assistance, interactive manuals, graphical operating systems, information retrieval, auditing and tracking systems, authoring systems, games, audiovisual programs, edutainment programs, etc.

However, conventional hyperlinking tools require the developer to embed linking codes or "anchors" manually in the content file which is to be rendered interactive. For example, if the content is a voluminous collection of "pages" to be displayed to the user, such as for an electronic encyclopedia, then conversion would require a large amount of time for the developer to embed hyperlinking codes around each text object for each page of content. A current candidate for a universal language for marking documents and embedding hyperlinking codes is called Standard Generalized Markup Language (SGML). A multimedia extension to SGML known as HyTime has been accepted by the International Standards Organization (ISO) for marking of documents which may incorporate audio and video media. However, even when such hyperlinking tools are used for media content, such as a digitized video sequence, the marking of the sequence for "live" interactive use is currently accomplished by embedding hyperlinking codes around the object in each frame of the sequence (typically 30 frames per second for full motion sequence).

Digital video editing tools have also been developed for painting, coloring, sizing, altering, or otherwise editing still and motion images, compositing multiple images, text, and sound tracks together, animating and morphing images, compressing multimedia files for storage or transmission, etc. However, almost all such digital media editing tools require alteration of the underlying raw content file in order to create a new digital media content file. In most cases, conventional editing tools embed proprietary codes or use proprietary file formats to modify or re-specify an existing content file. As a result, the edited media file can only be run on compatible systems or platforms that have complementary display, playback, or decompression tools.

SUMMARY OF THE INVENTION

It is therefore a principal object of the present invention to provide a system for allowing media content, particularly a broad base of existing media content, to be used in interactive media programs. A specific object is to convert media content for interactive TV use without locking it in to any particular delivery system or display platform, i.e., without embedding proprietary codes in the original media content. It is a further object to provide an authoring system for developing interactive media programs from existing media content using automated tools which can reduce the development time.

In accordance with the main object of the present invention, a system for allowing media content to be used as an interactive media program comprises: (a) media content in the form of media data representing a series of successive image display frames indexed in a time sequence; (b) object mapping data specifying display locations of objects appearing in the image display frames of the media content which are to be rendered interactive: (c) linkages provided through an associated interactive media program from the objects specified by the object mapping data to respective interactive functions to be performed upon user selection of the objects in conjunction with a display of the media content; and (d) a user system for operating the interactive media program in conjunction with the display of the media content by selecting an object appearing in one or more image display frames using said object mapping data specifying its display location in the image display frames and performing the interactive function linked by the corresponding linkage of the interactive media program thereto.

In accordance with the specific object of this invention, the object mapping data representing the display locations of the interactive objects are maintained physically and logically separate from the media content data. The media content is thus kept intact and uncorrupted by any embedded special codes, so that it can be delivered and displayed on any media delivery system or display platform. The object mapping data are preferably in a standard display location definition format so that they can be used in a wide variety of interactive media programs.

In accordance with a further object of the invention, an authoring system comprises: (a) an editing subsystem for editing media content in the form of media data representing a series of successive image display frames indexed in a time sequence; (b) an object mapping subsystem for generating object mapping data specifying display locations of objects appearing in the image display frames of the media content which are to be rendered interactive; (c) interactive media program development tools including a hyperlinking tool for establishing linkages from the objects specified by the object mapping data to respective interactive functions to be performed upon user selection of the objects in conjunction with a display of the media content; and (d) said object mapping subsystem having an object mapping tool for defining the display location of an object to be rendered interactive by marking the position of the object as it appears in an image display frame. The object mapping subsystem may further include a motion tracking tool for defining the display locations for an object in motion across successive image display frames by marking the position of the object as it appears in a first image display frame and detecting the positions of the object over subsequent image display frames.

In a preferred interactive TV system, media content, in the form of movies, TV programs, advertising, and the like, can be presented as interactive media programs by transmitting media content data and object mapping data for interactive objects ("hot spots") to a TV set top box connected to a viewer's TV. The TV set top box may be of the advanced type having digital processing components for running a high-level interactive media program in conjunction with analog or digital (e.g., HDTV) video content through a two-way high-bandwidth cable connection and performing high-level interactive functions such as linking hot spots in the TV content to Internet addresses and displaying related pages on the World Wide Web simultaneously with the TV content.

Interactive TV programs of a lower level of interactivity can also be presented using a conventional TV set top box and remote control in conjunction with the current analog video content. For example, the analog video content may be transmitted to the viewer on a channel provided by a cable TV company, with the object mapping data and program linkages for interactive functions transmitted in the video blanking intervals (VBI) interleaved with the video frames. Alternatively, the object mapping data and interactive program linkages may be transmitted to the viewer's set top box via a different channel, an available side band of the assigned cable TV spectrum, or through a telephone line, cable modem, or other transmission link connected to the set-top box. The set top box processor uses the object mapping data to highlight the display of interactive objects appearing in the TV content and to perform an interactive function when the viewer toggles through the highlighted objects and presses a control key to select a particular object. The hot spots may be not only image objects appearing in the original TV content, but also non-image objects such as pop-ups, and/or buttons overlaid on the TV content as enhanced media content. Thus, a broad base of existing TV content can be rendered as interactive entertainment even with the conventional cable TV system.

The present invention is described in greater detail below, together with its further objectives, features and advantages, in conjunction with the following drawings:

BRIEF DESCRIPTION OF THE DRAWINGS

FIG. 7a is a schematic illustration of an interactive TV program in a conventional cable TV environment wherein the viewer selects a hot spot on the display by toggling through the hot spots using control buttons on the TV remote.

FIG. 7b is a schematic illustration of the TV signal for the interactive TV program having the TV content transmitted as analog video signals at timed intervals interleaved with hot spot data and interactive function data transmitted in the video blanking intervals between video signal intervals.

DETAILED DESCRIPTION OF THE INVENTION

Figure 1:
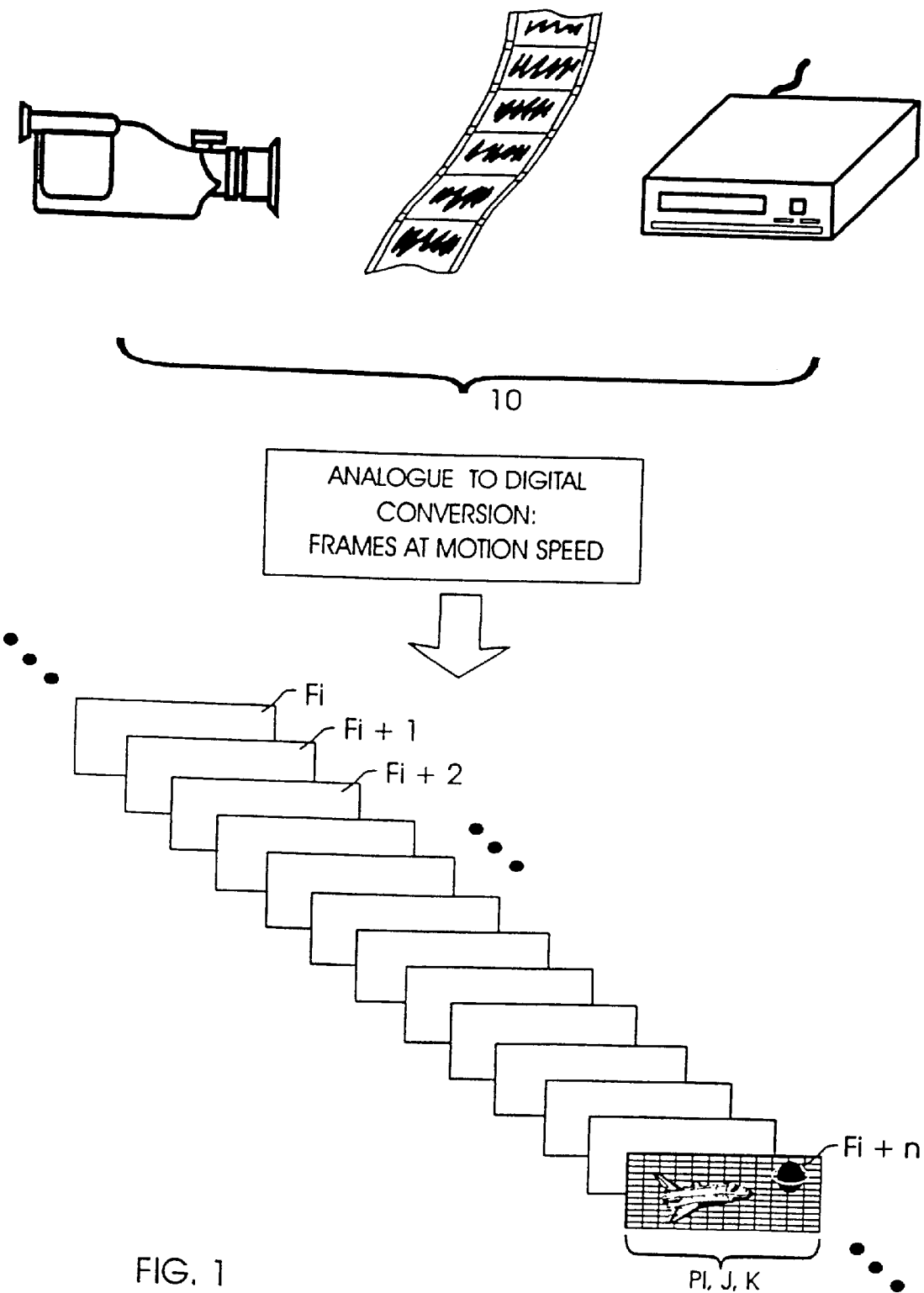
FIG. 1 is a schematic drawing showing the conversion of original media content to digital frame data.

Multimedia systems have evolved to sophisticated systems today that can support photographic quality resolution (1280×1024 pixels), millions of colors on a display screen, high-fidelity audio, large-scale storage and retrieval of still and full-motion video, large-scale arrays of memory storage, plug-and-play interfaces to multimedia devices, and high-capacity network linkages that can support digital video and videoconferencing from desktop systems. For an overview of hardware and software technologies developed for multimedia systems, reference is made to Multimedia Systems, edited by Jessica Keyes, published by Mc-Graw Hill, Inc., 1994.

The rapid technological advances of the last decade have made digital full-motion video available on today's desktop systems. In the next decade, advanced network technologies and integrated multimedia distribution systems will permit full-motion video with high-fidelity audio to be delivered on demand to offices and homes virtually anywhere in the world. Such advanced systems and the possibilities for their use are described in Interactive Television: A Comprehensive Guide for Multimedia Technologies, by Winston W. Hodge, published by McGraw-Hill, Inc., 1995. For such future, and even current, multimedia systems, a high demand will be placed on being able to make interactive use of the huge base of existing content, particularly media content such as movies, videos, and television programming.

It is projected that a primary scenario for delivery of video-on-demand (VOD) in the future will be through an office workstation or an interactive television set at home connected via cable, fiber, or other high-bandwidth link to network servers of a media services company for a local area.

The interactive television set is expected to have an advanced set-top box for handling subscribers' requests and uses of interactive media services. Principal services which customers are expected to ask for include program and viewing time selection, order placing, menu navigation, home shopping, interactive games, random scenes selection, TV set controls, and subscriber billing review. For simplicity and ease of use, the television and set-top box should be controlled by a simple remote device which will include a light-beam pointer for pointing to menu choices, icons, windows, photographs, and other objects of interest appearing on the screen. A primary application of the present invention is to facilitate the conversion of non-interactive media content to interactive digital media use by establishing remote-controllable objects or "hot spots" on the television screen display for user selection.

A basic concept of the invention is the mapping of objects in digital media presentations as "hot spots" without embedding any special codes in the original digital media content. This is accomplished by specifying the display location coordinates of selected objects within a frame or series of frames of a display and their frame addresses. The display location coordinates and frame addresses of the "hot spots" are stored as data that are physically of at least logically separate from the media content. This allows the original media content to be accessed and run on any system without having to handle proprietary or platform-dependent codes. The coordinate/address data of the "hot spots" are preferably in a standard format that can be accessed by any interactive digital media (IDM) program written to run with that media presentation. When the media content is played with the IDM program, a user can select "hot spots" appearing in the display to trigger further developments. The IDM program responds to user selection of "hot spots" by launching further layers of display presentations and/or triggering other program functions, such as launching another application, initiating the operation of another system, or connecting to an external network such as a World Wide Web™ page or service on the Internet.

The following description of the invention focuses primarily on the mapping and use of "hot spots" appearing in the visual display of a digital media presentation. However, it should be understood that a "hot spot" can be any object identifiable in any type of digital presentation, including a sound or music segment or even a bodily response in virtual reality systems.

Interactive Digital Media System Overview

In a basic implementation of the invention, as illustrated in FIG. 1, original media content 10, such as a movie, video program, or live television program captured by a video camera, etc., is digitized via an analog-to-digital (A/D) converter 12 into digital data representing a series of display frames $F_i$, $F_{i+2}$, $F_{i+3}$, . . . , in a time sequence t for display on a display screen. Each frame F has a frame address i, i+1, i+2, . . . corresponding to its unique time position in the sequence, and is composed of an array of pixels $p_i$ uniquely defined by location coordinates represented by j rows and k columns in the display area of each frame. The pixels of the frame are also digitally defined with chrominance and luminance values representing their color and brightness levels on the display. For full motion video, a sequence of 30 frames is typically used per second of video. Each frame is composed of an array of pixels forming the display at the screen's given resolution, e.g., 640×480 pixels at a typical VGA resolution, or 1280×1024 at a higher SVGA resolution. Color resolution at a high 24-bit level may also be used. Thus, for a desktop system using a 32-bit internal data bus, and depending on whether and what data compression scheme is used, full motion video of 30 frames per second at full color, SVGA resolution can have a digital data stream from about 250 KBytes to 1.2 MBytes per second.

Figure 2:
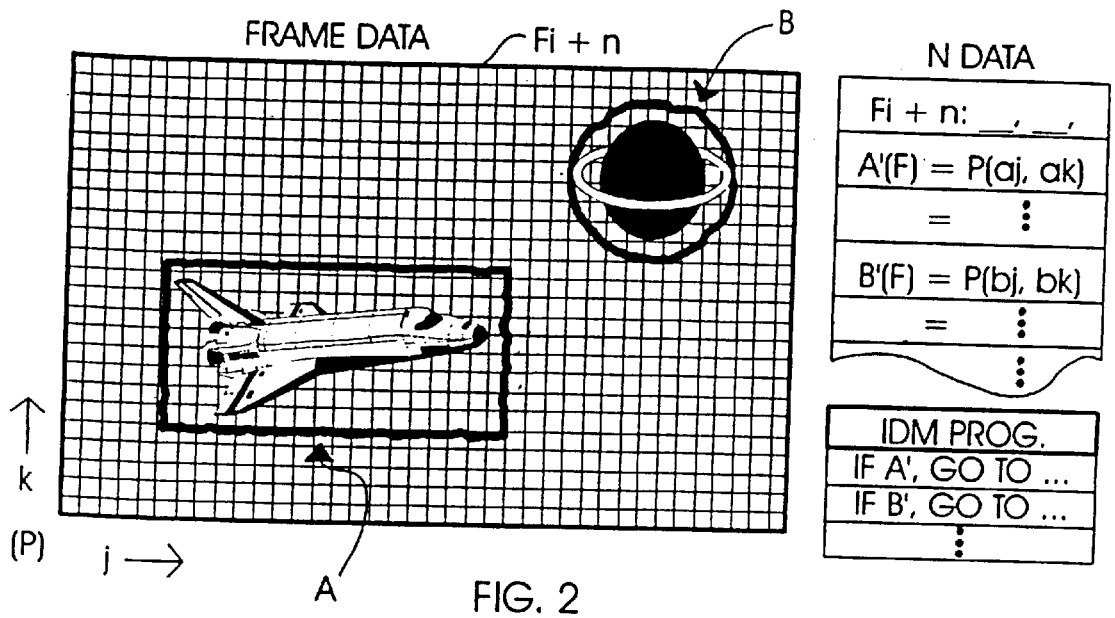
FIG. 2 is a schematic drawing showing the generation of object mapping data designating "hot spots" in a display frame.

In FIG. 2, an individual frame is illustrated showing an image of an object A such as a face next to an object B such as the sun. In interactive use, the user can point at (click on) the face A or the sun B to connect to further information or a further development in the story being presented. In accordance with the invention, the original media content is converted to interactive use without embedding special codes in the digital data for the frames, by mapping the "hot spots" as separate data which are used in an interactive digital media program associated with the media content. Thus, for the frame $F_j$, a "hot spot" area A' ($F_i$) is mapped for the object A, and a "hot spot" area B' ($F_i$) is mapped for the object B. The definition of a "hot spot" can be made by defining a set of pixels in the display which comprise an outline around the designated area, e.g., $p(a_j, a_k)$ . . . . . Alternatively, the area may be defined by a vector contour encompassing the designated area, or any other suitable array definition method as is well known in the computer graphics field. The display location coordinates of the defined pixels and the frame addresses of the frames in which the area appears are stored separately as object mapping data.

The original media content is thus rendered in the form of a stream of digital data, referred to herein as "Frame Data", which represent the series of display frames F constituting the movie or video sequence. Concurrently, for each frame $F_i$, the object mapping data, referred to herein as "N Data", are generated to define the display location coordinates of designated "hot spot" areas in the frames of the movie or video sequence. In accordance with a basic principle of the invention, the N Data mapping the "hot spots" are maintained as physically or at least logically separate data from the Frame Data for the media content. For example, the Frame Data and the N Data may be recorded as physically separate sectors on a video laserdisk or CD, or may be stored as logically separate data files in the memory storage of a video server. In this manner, the objects which are rendered interactive in the original media content are tagged for use in a compatible interactive digital media (IDM) program without embedding any proprietary or platform-dependent codes in the media content. Thus, the media content data can be run on any digital media player and the N Data can be used by any IDM program.

The N Data defining the "hot spots" are preferably in a standard industry format for the frame addresses and display location coordinates for the designated objects, as explained further herein. The standard-format N Data can thus be accessed by any interactive digital media (IDM) program written in standard applications programming languages. In accordance with the invention, the N Data define the location of the designated "hot spots" or "anchors" to which hyperlinks are established in the IDM program. This is represented in FIG. 2 by "IDM PROG." which references the "hot spot" N Data values as anchors for hyperlinks to other files or executable functions ("GO TO . . . ") . Then when a user clicks on a designated "hot spot" by pointing to any display position encompassed within the area defined by the object mapping data, the IDM program recognizes that the object pointed to has been selected, and consequently causes the other file or function linked to the "hot spot" to be performed.

Running Media Content and IDM Program from Network Server

Interactive digital media programs in accordance with the invention can be run on any of a wide range of platforms. In large media services networks, the media content, N Data, and associated IDM programs are downloaded via the network to user or subscriber terminals upon request. For individual use, the programs are loaded via peripheral devices into personal computers, game players, or other media playing consoles. The following description focuses on the delivery of media content and IDM programs through networks, such as cable TV, telephone networks, digital line and fiber optic networks, and wide area digital networks. In the future, the prevalence of network delivery of interactive media services is expected to increase greatly toward a paradigm often referred to as the "multimedia revolution".

Figure 3:
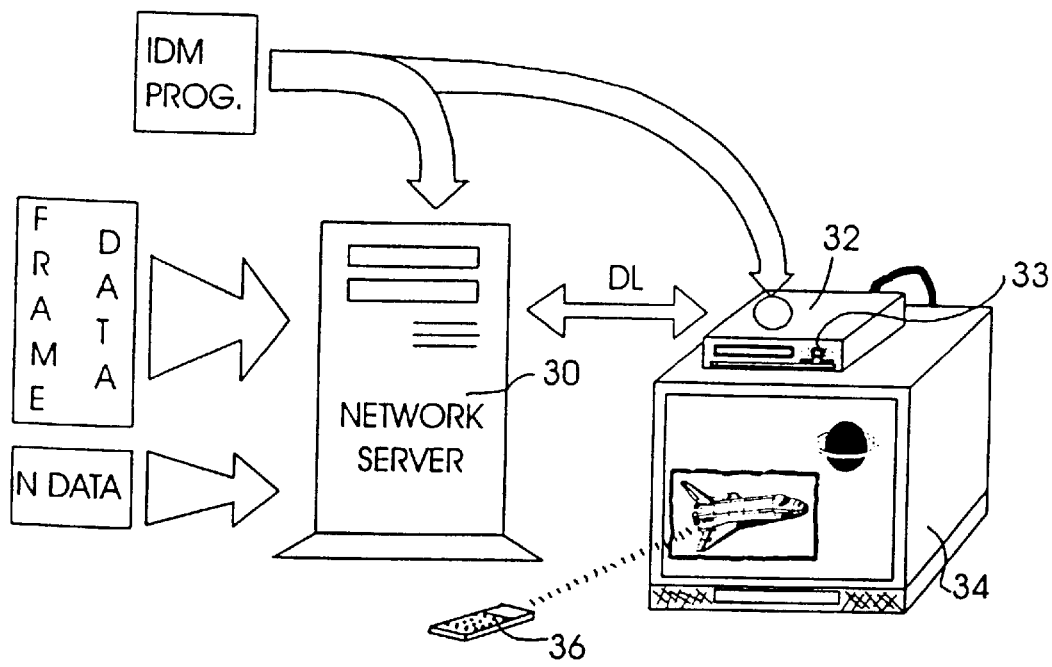
FIG. 3 is a schematic drawing showing the transmission of digital data for the original media content and object mapping data for objects therein from a network server to a subscriber terminal.

An example of network delivery of interactive digital media programs in accordance with the invention is shown schematically in FIG. 3. Typically, a network server 30 provides media services from a node or hub in a company's service area. The server 30 is coupled to subscriber terminals through a suitable data transmission link DL, such as cable wiring, fiber optic lines, telephone wiring, or digital data links. The subscriber's terminal is typically in the form of a "set-top" box 32 connected to the subscribers' TV or screen display 34, but it can also be a computer or other type of terminal. An important concept for network media services is "video-on-demand", wherein the server 30 can access large digital libraries of movies, videos, and other types of media content and transmit them to subscribers upon request. The server 30 transmits both the Frame Data for the media content and the N Data and IDM program for rendering the "hot spots" therein interactive to the subscriber's set-top box 32 via the data transmission link DL. The subscriber uses a remote control device 36 to operate the set. For interactive use, the remote device 36 includes an optical pointer which emits an infrared or other light beam. As known conventionally, a sensor 33 in the set-top box is used to detect the position and angle of the beam from the remote control pointer in order to detect the area of the display 34 being pointed to.

The media content with N Data delivered to the subscriber is operated interactively by the subscriber through the IDM program. The IDM program can be a dedicated program indexed to N Data which are specific to a single type of interactive use of the media content. Alternatively, a production studio or studio library which owns the media content property may find it more effective to publish a complete listing of N Data for an owned property which includes a mapping of all "hot spots" likely to be of interest for interactive programs. IDM program writers can then use the published listing of N Data to create many and more diverse program offerings for a particular media content property. For dedicated IDM programs, the IDM program data can be stored together with the N Data in association with the media content and transmitted together by the server 30 to the subscriber's terminal. For multi-use IDM programs, the N Data can be stored in association with the media content and transmitted from the server 30, while subscribers can choose any IDM program they wish to play from a publishing or retail outlet and load it into their terminals via a peripheral device provided with or connected to their set-top box 32, such as a CD-ROM drive or a ROM card insertion slot.

Figure 4:
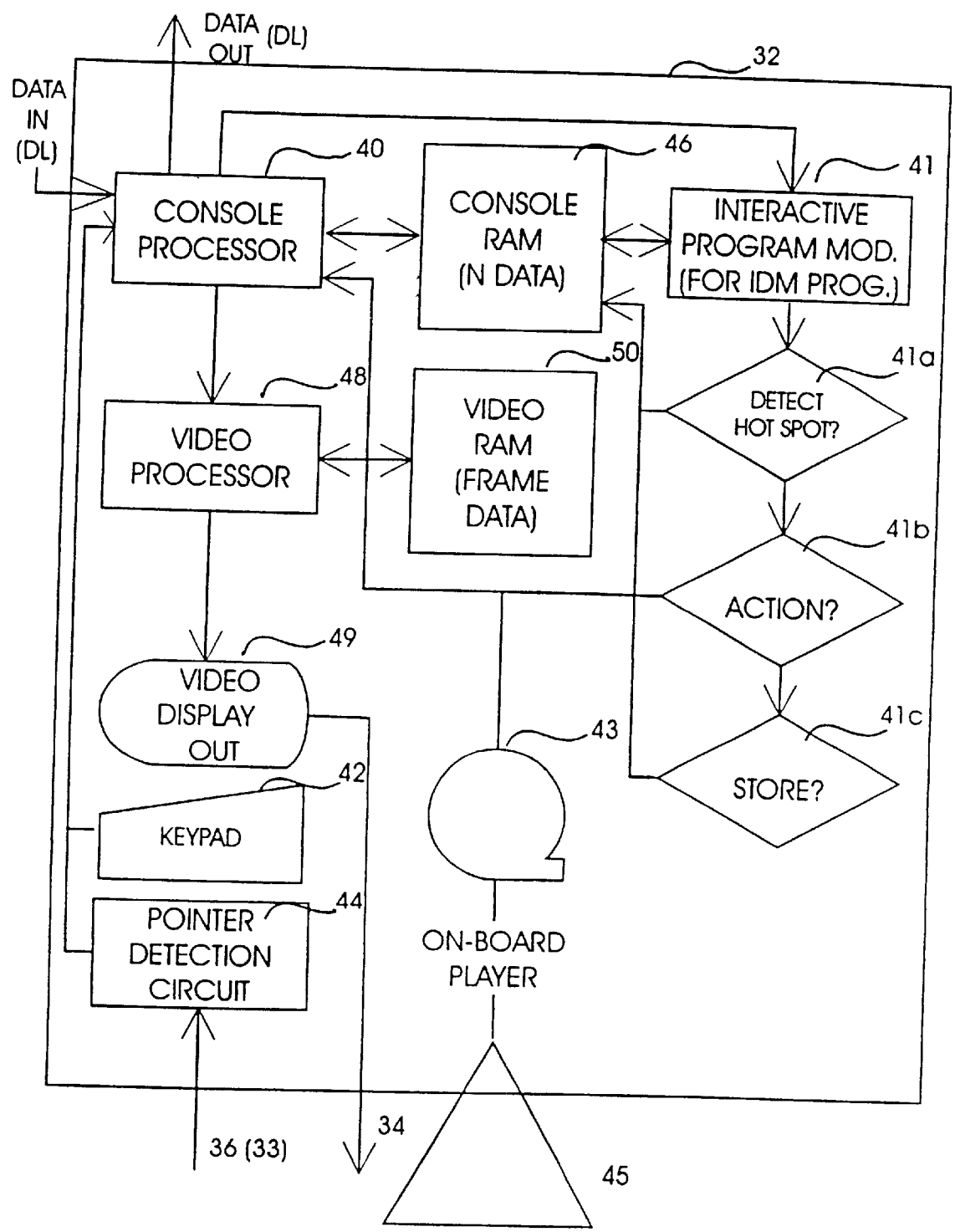
FIG. 4 is a schematic diagram of the components of a subscriber terminal for use in conjunction with an interactive digital media program.

FIG. 4 illustrates schematically how an interactive digital media system uses the media content Frame Data, N Data, and the IDM program together to provide interactive entertainment. The system includes the aforementioned set-top box 32, display 34, remote control pointer 36, and data link DL to the external network server. An on-board CD-ROM player or other data reading device 43 may be provided with the set-top box 32 for input of data, indicated at 45, such as by loading from a selected CD or insertable disk or card. Input from the remote control pointer 36 is detected by the sensor 33 on the set-top box and processed to determine its target via a pointer detection circuit 44.

In the principal mode of use, the subscriber inputs a request to the service company for an interactive media program through the set-top box 32, using an on-board keypad 42 or through menu selection by using the remote control pointer 36. For example, the subscriber can request the interactive program "Movie Trivia Info" for the movie "The Maltese Falcon". This interactive program will run the movie while displaying pop-up movie trivia about the stars Humphrey Bogart, Sidney Greenstreet, and Peter Lorre or objects such as the Maltese falcon whenever the user clicks on these "hot spots" appearing in different scenes of the film. To the user, movie viewing which had been a passive experience is rendered interactive so that the user can play trivia games or spark conversations in conjunction with the running of the movie.

A console processor 40 for the set-top box processes the subscriber request and transmits it via the data link DL to the network server 30. In return, the server 30 first transmits the IDM program data for "Movie Trivia Info" and the N Data for the movie to the subscriber's set-top box where the console processor 40 operates to store the data in a console RAM memory 46. The console processor 40 can load and run the IDM program as a multi-tasking function concurrently with other console functions, as indicated in FIG. 4 by the separate module 41. Alternatively, the IDM program can run on a separate processor (41) in parallel with the console processor.

The remote downloading and playing of games and other types of interactive programs can be used even with conventional cable TV networks which do not presently have a two-way data link DL between server and subscribers. In an example for video games, the cable company broadcasts modulated signals for the game data on a dedicated cable channel. In response to a subscriber's telephone request, the cable company transmits a signal enabling the subscriber's converter box to receive the data. The game data is then demodulated through a modem connector and downloaded to the subscriber's game player. For purposes of the present invention, this would allow loading of the IDM program and N Data in the game player. The game player can now operate the IDM program in conjunction with the media content, as described next.

After the IDM program is loaded, the network server 30 begins to transmit the movie as digital Frame Data to the subscriber's set-top box 32. The Frame Data is routed by the console processor 40 to the video processor 48 and associated video RAM memory 50 which process the display of frames of the movie via video display output 49 to the subscriber's television 34. Audio processing is subsumed with the video processing and is not shown separately. For typical video-on-demand servers, a requested movie can be transmitted to the subscriber as a series of 30-second movie blocks within a 6-minute start of a request. The video processor coordinates the receipt of the blocks of transmitted data into a display of video output which the user sees as a continuous movie.

As designed for interactive video systems, the remote control 36 includes an optical pointer for digitally pointing to objects displayed on the television screen. As the movie runs, the user can point the remote control pointer 36 to a designated actor or object appearing on the television display and click on the desired object. The N Data for the movie defines the area encompassing the object as a "hot spot". Clicking the pointer results in the target's display location coordinates being detected by the pointer detector module 44. The target's coordinates are input via the console processor 40 to the IDM program running concurrently with the movie. As indicated at box 41a, the IDM program compares the target's coordinates to the N Data mapping of "hot spots" stored in memory to identify when a "hot spot" has been selected, and then executes the response programmed by the hyperlink established for that "hot spot", as indicated at box 41b.

For example, the hyperlinked response may be to display trivia information about the actor or object clicked on. The IDM module retrieves the trivia information stored with the IDM program in memory and sends it to the console processor 40 to process a pop-up window, overlay display, audio track, etc., in conjunction with the movie. To illustrate, upon the user clicking on the Maltese falcon, the hyperlink established in the "Movie Trivia Info" program can initiate a linked display of text or graphics explaining the Maltese origins of the falcon in a pop-up window on the television screen, or may execute another program function such as initiating an Internet connection to a World Wide Web service which offers a replica of the falcon for purchase. In this manner, unlimited types and varieties of interactive actions can be activated for existing movies, videos, and other media content.

As an option, upon selection by a user clicking on an object, the IDM program can issue an instruction via the console processor 40 to the video processor 48 to slow down or pause the running of the movie to allow time for the user to absorb the IDM program response. Alternatively, the user may wish to bypass the response and store it to be reviewed after the movie is finished. By input from the remote control pointer 36 (e.g., clicking on a displayed "Save" button), the particular scene location and clicked object and/or its linked response can be saved in the console RAM 46 for retrieval during a Review mode of the IDM program, as indicated at box 41c in FIG. 4.

Authoring and Mapping of "Hot Spots" As N Data

The mapping of "hot spots" or objects appearing in original media content to enable the operation of an interactive digital media (IDM) program is an important aspect of the present invention. In the production of an IDM program, the initial work of creating linkages between words, graphic images, objects, and/or scenes of a movie or video sequence to other interactive functions is referred to as "authoring". An author typically works on a workstation using editing and hyperlinking software provided with various tools for working with particular media. An example of authoring software for multimedia programs is the PREMIER™ multimedia development system sold by Adobe Systems, Inc., of Mountain View, Calif. Such an authoring system is typically provided with editing tools which can be adapted as "hot spot" mapping tools for authoring IDM programs in accordance with the present invention.

Technology for mapping objects appearing in a display frame has been developed in the fields of interactive program development as well as for video editing. For example, the LINKSWARE™ hypertext development software offered by LinksWare Company, of Monterey, Calif., allows an author to click on a word or phrase in a text document and create a hyperlink to another file, and to store the linking information separate from the document itself. Video editing software sold under the name ELASTIC REALITY 3™ by Elastic Reality, Inc., of Madison, Wis., has shape creation and compositing tools which can outline a shape in an image field and store the shape data as a separate file.

The above described tools which are currently available can be adapted to the purposes of the present invention for authoring an IDM program by mapping "hot spots" in a media presentation. That is, using a shape outlining tool similar to that offered in the ELASTIC REALITY 3™ software, an object A as shown in FIG. 2 can be outlined with a cursor, and the display coordinate addresses for the pixel elements of the outlined shape can be stored in a separate file as object mapping data. Consequently, a hyperlinking tool similar to that offered in the LINKSWARE™ software is used to establish programmed hyperlinks of the object mapping data to other program functions which provide the IDM program with its interactive responses. The details of use of such editing and hyperlinking tools is considered to be within the realm of conventional technical ability and is not described in further detail herein.

Figure 5A:
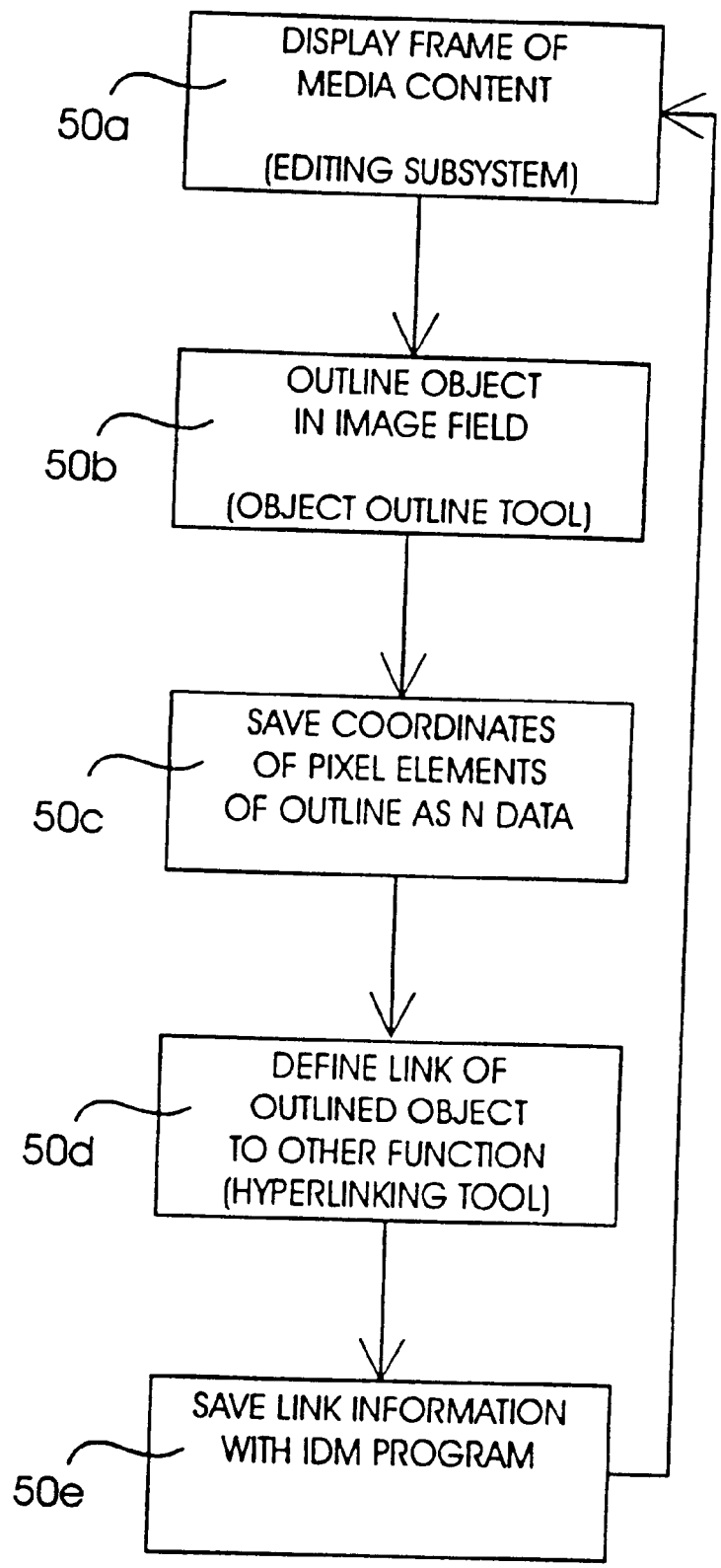
FIG. 5A is a procedural diagram for an object mapping tool for generating N Data for objects in a display frame.

An example of a procedural sequence for using an object mapping tool in an authoring system is shown in the diagram of FIG. 5A. First, a display frame of the media content is called up on the editing subsystem, as indicated at box 50a. Using an outlining tool similar to that provided in the ELASTIC REALITY 3™ software, the author can draw an outline around an object in the image field using a pointer or other cursor device, as indicated at box 50b. The outline, i.e., the display location coordinates of the pixel elements constituting the outline, and the frame address are saved as N Data at box 50c. Then using a hyperlinking tool similar to that provided in the LINKSWARE™ software, the author can define a hyperlink between the object outlined, now specified as N Data, and another function to be performed by the IDM program, as indicated at box 50d. The hyperlink information is saved with the IDM program at box 50e. The procedure is iterated for all objects to be mapped in a frame and for all frames of the movie or video. The IDM program can be stored together with the N Data or separately, depending upon whether the N Data is for dedicated use or multi-use.

The object mapping function can use the same outline data of one frame for succeeding frames if the object appears in the same position in the other frames, i.e., is non-moving. This saves the author from having to draw the same outline in the other frames. Even further, the outline data of a non-moving object appearing in a first frame can be stored with only the frame address of the last frame in a sequence in which the object appears unchanged in order to compress the N Data required to map the object over the sequence of frames. The IDM program can later uncompress the N Data and use the same outline data for the sequence of frames.

In accordance with a further development of the present invention, the object mapping procedures can include a motion tracking tool for automatically generating N Data for an unchanging object in motion across a sequence of frames. It will be appreciated that the mapping of a number of "hot spots" in each frame of a full motion video sequence or movie which may run from a few minutes to a few hours duration can be a hugely laborious task. Motion tracking and motion estimating techniques have been developed recently which can be adapted for a motion tracking tool to be used in the invention. For example, a motion tracking program named ASSET-2 developed by Stephen M. Smith at the U.K. Defense Research Agency, Chertsey, Surrey, U.K., uses feature segmentation and clustering techniques to produce an abstracted cluster representation of objects in successive frames of a video sequence. Using statistical comparisons, a cluster characterized by a similar set of features appearing at different positions in a path across a series of frames can be recognized as an object in motion. The object can then be tracked to varying degrees depending upon the sophistication of the particular applications program, such as for traffic monitoring, target acquisition, etc. At the simplest level, an object in motion is detected if it is unchanging, i.e., is not rotating or being occluded by other objects in three-dimensional view. With more advanced techniques, the object can be recognized if it retains some recognized features while rotating or moving behind another object. A general description of motion tracking or motion estimating techniques is given in Machine Vision, by R. Jain, R. Katsuri, and B. Schunck, published by McGraw-Hill, Inc., New York, N.Y., 1995.

Another motion estimating technique is one used for compression of video images. MPEG-2 is a video compression standard developed by the Motion Pictures Expert Group, a committee of the International Standards Organization (ISO). MPEG-2 uses interframe predictive coding to identify pixel sectors which are invariant over a series of frames in order to remove the invariant image data in subsequent frames for data compression purposes. A general description of MPEG-2 and motion estimating techniques is given in Digital Compression of Still Images and Video, by Roger Clarke, published by Academic Press, Inc., San Diego, Calif., 1995.

Figure 5B:
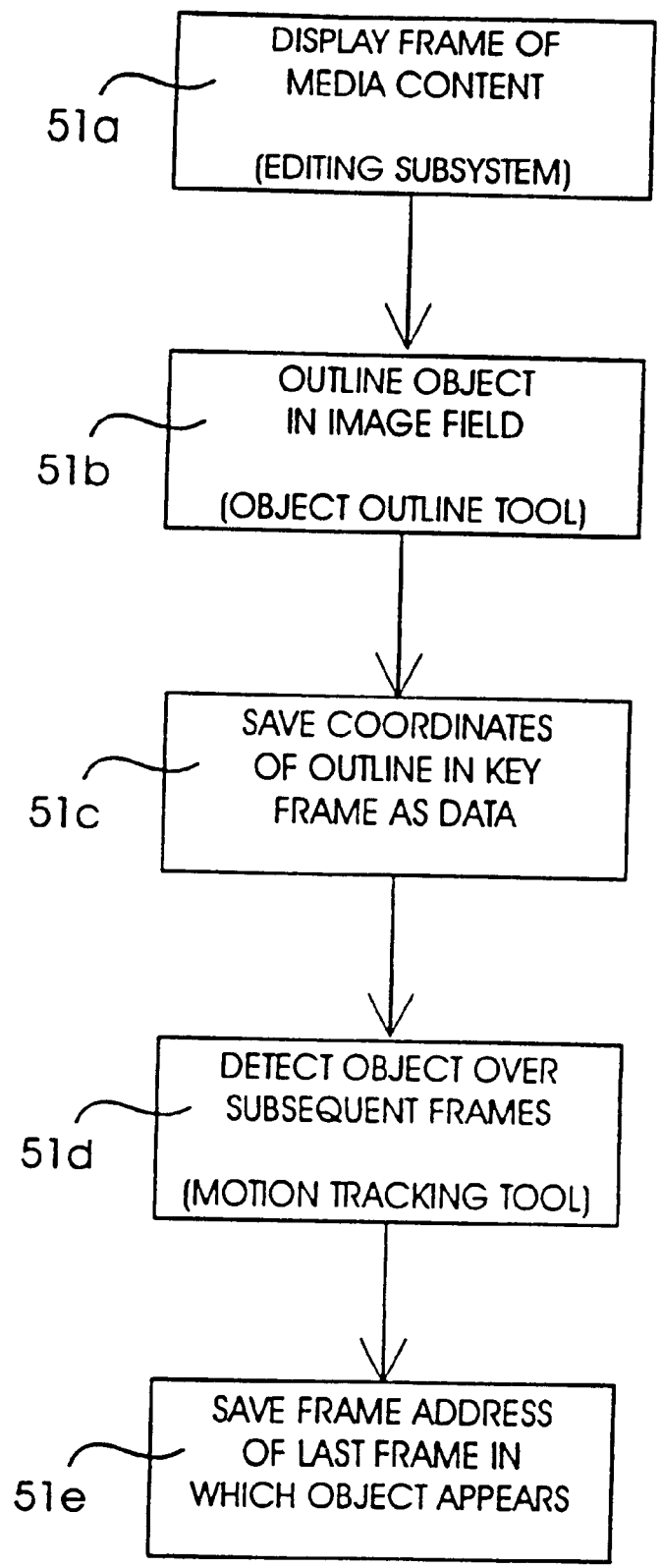
FIG. 5B is a procedural diagram for an object motion tracking tool for generating N Data for objects in motion over a sequence of display frames.

The above described motion tracking techniques are adapted to the present invention to automate the generation of N Data for objects in motion in a movie or video sequence. An example of a procedural sequence for using a motion tracking tool in an authoring system is shown in the diagram of FIG. 5B. First, a display frame of the media content is called up on the editing subsystem, as indicated at box 51a. Using an outlining tool as before, the author draws an outline around an object and marks its position as it appears in a first or "key" frame, as indicated at box 51b. The outline data, position, and frame address are saved as N Data at box 51c. Then, a motion tracking tool similar to the ASSET-2 system of the U.K. Defense Research Agency or the MPEG-2 motion estimating technique is used to detect the image of the object as it moves across subsequent frames at box 51d, until a last frame in which the object is detected is reached. The position of the object and frame address of the last frame in the sequence are then saved as N Data at box 51e. The use of the motion tracking tool saves the author from having to draw the outline around the object in each frame of the sequence, and also compresses the amount of N Data required to specify the mapping of the object in those frames.

Figure 5C:
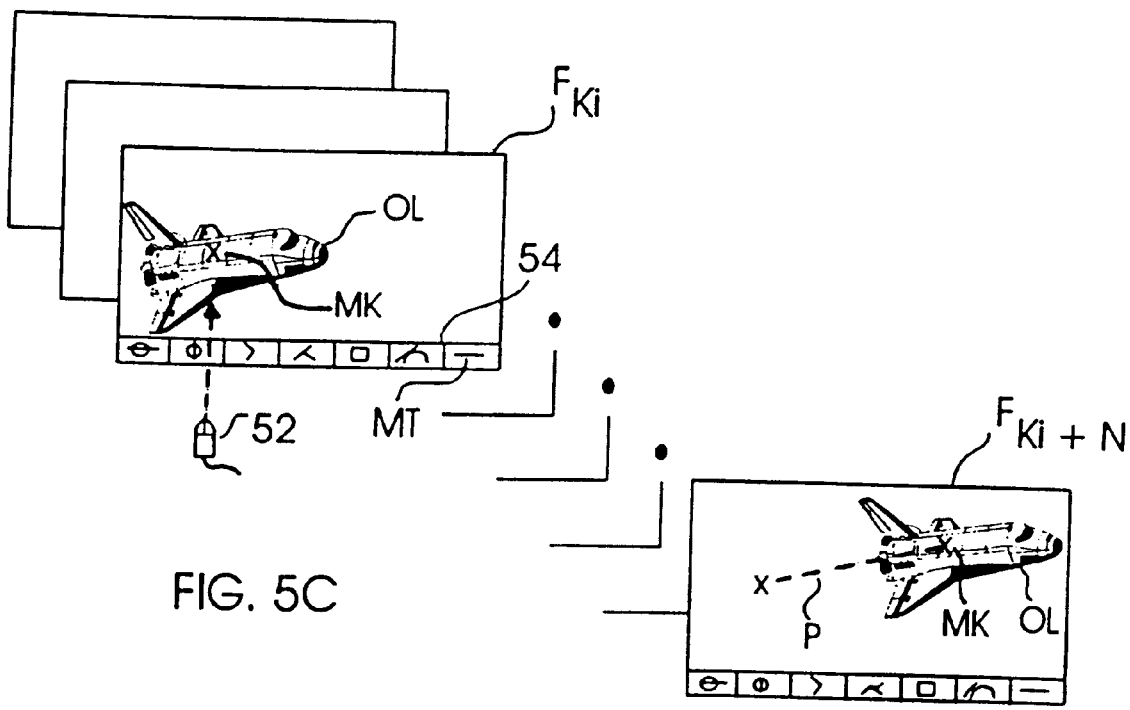
FIG. 5c illustrates use of the mapping and motion tracking tools for automatically generating N Data for an object in motion.

The use of the motion tracking tool for N Data generation in accordance with the present invention is illustrated in FIG. 5C. The author first brings up on the workstation a key frame $F_{Ki}$ of a series of frames in a full motion movie or video sequence. Using a mouse or other type of pointing device 52, the author delineates an object in the key frame, such as the airplane shown in frame $F_{Ki}$, by drawing an outline OL around the airplane. The author also marks the position of the object in the key frame by designating a marker MK in a central position within the outline OL in frame $F_{Ki}$. The author then runs the motion tracking tool by clicking on an MT button of a tool bar 54 in a graphical interface for the authoring program. The motion tracking function operates to identify the object indicated to be within the outline OL in frame $F_{Ki}$ where it appears in the succeeding frames of the sequence until a last frame $F_{Ki+N}$ is reached in which the object is detected. The outline data and position of the object in the key frame and the position and frame address of the last frame are stored as N Data by the authoring system.

Alternatively, the authoring system can use a conventional editing tool for advancing through a sequence of frames and marking the position of the object as it moves across the frames until a last frame is reached. This allows a path P of motion to be specified in terms of the progression of positions of the marker MK for the object. For motion that follows a straight line or simple curve, the author can simply mark the outline OL and the marker MK in frame $F_{Ki}$ and mark the end position of the marker MK in a selected frame N steps removed from the key frame. Smooth motion to the human eye can be approximated well by a display of image frames at the rate of about 30 frames/second. A typical selection for the number N of frames for following an object in motion smoothly might be an interval of 15 (0.5 second), 30 (full second), up to 60 (2 seconds) frames or more. The author thus advances to frame $F_{Ki+N}$ and marks the position of the object in that frame. The path P can then be automatically filled in using a typical "in-betweening" function commonly provided in video editing software, such as the ELASTIC REALITY™ software, or a simple vector function. The outline and the path data are then stored as N Data.

With the above described object mapping and motion tracking tools, an author can readily outline a number of "hot spots" in a full motion sequence and generate N Data automatically over a series of frames. The automatic generation of N Data over extended time increments makes the mapping of objects in media content of long duration such as a two-hour movie a manageable task. When the N Data has been specified for the mapped objects, hyperlinks to other interactive functions can be readily established using conventional hypermedia authoring tools.

Distribution of Media Content and N Data

Figure 6:
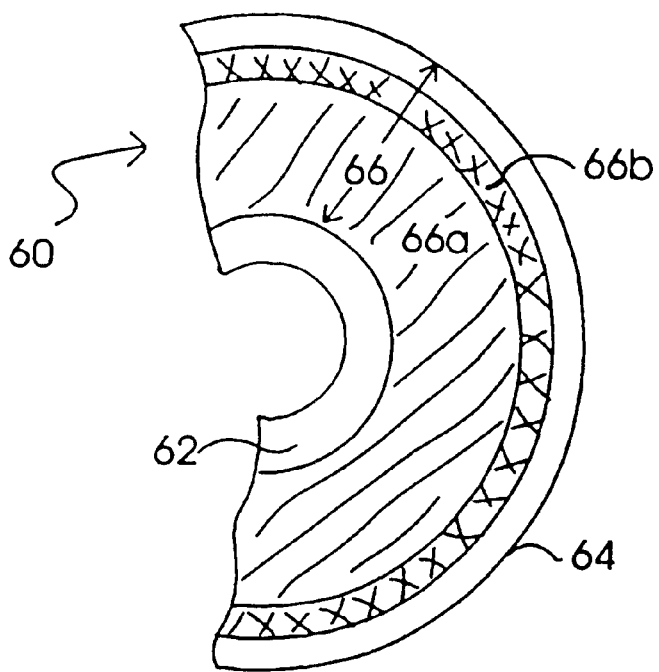
FIG. 6 is a schematic illustration of a disk storage format for recording media content data with object mapping data for an interactive digital media program.

In the present invention, the N Data for marked objects are maintained as separate data from the media content so as to leave the latter uncorrupted by any embedded or proprietary codes. The IDM program with its hyperlinking information may be stored with the N Data or as a separate program depending upon whether the N Data is for dedicated use or multi-use. The transmission of media content and N Data, with or without the IDM program, has been described previously for a network. For product distribution and individual purchase, the media content and N Data (with or without the IDM program) are recorded in a unique format in a storage disk. An example of such a disk 60 is shown in FIG. 6 having a center hub 62 and an outer edge 64 with an optically readable data space 66 therebetween. Digital data for programs, sound tracks, video sequences, movies, etc., are typically stored as optically readable marks representing binary 1s and 0s in the data space 66. For media of smaller total data volume, e.g., 640 megabytes and under, the industry standard is a compact disc or CD which is written on one side. For larger data volumes up to 10 gigabytes and higher, such as for full-length movies and videos, laser disks of a larger size, and new disk formats of CD size with multiplied data density written on both sides, have been developed.

In FIG. 6, the media content data is shown stored in a large inner sector 66a, while the N Data is stored on a narrow outermost sector 66b. Isolating the N Data on the outer extremity of the disk in this way allows the disk to be used both in new players which can utilize the N Data for interactive programs, as well as in conventional players which simply playing back the non-interactive media content. The new disk players for interactive media content are configured to be able to read the outer N Data sector and retrieve the N Data for use in an IDM program. If the N Data is for dedicated use, then the IDM program may also be stored with the N Data in the outermost sector 66b. Using data compression techniques as described above, the N Data for media content of even a long duration can fit in a relatively small data space, thereby taking up only a small percentage of the total disk space.

Using Interactive Media Content in Conventional TV Systems

The present invention allows the broad base of existing media content in the form of movies, TV programs, videos, advertisements, etc. to be rendered interactive through the authoring of hot spots having interactive functions defined by their positions in the display and used in conjunction with conventional TV programs. Existing TV content includes not only previously recorded movies, videos, shows, and ads, but also programs that are recorded live on film or videotape. TV content from live programs to classic movies can be merged with authored interactive functions into new interactive TV programs.

It is therefore very desirable to convert TV programs in conventional analog video signal format into interactive TV programs in order to allow the existing base of TV content to be used as interactive TV delivered through the existing broadcast and cable TV systems while a gradual transition is made to digital TV in the future. The TV industry is recognizing that interactivity in advertising, infomercials, and home shopping shows can attract greater viewer interest and therefore can generate more revenues for the TV networks.

For example, home shopping shows can be rendered interactive by mapping the products displayed on the TV screen as hot spots to allow switching to or overlaying (in a window) additional information or follow-on options about the product selected by the viewer. The viewer's set top box can be downloaded with a stored product interaction program to perform basic functions expected for advertisements, infomercials, and home shopping shows, for example, sending a response back that the viewer is interested in buying the product or obtaining more information about it, displaying additional text and graphics concerning the product, or connecting to a related Web page on the Internet.

As another example, a TV program filmed live or transmitted on a taped delay may feature a number of speakers or entertainers. Rendering the talk show interactive can allow viewers to send responses back to the show or to obtain more information or trivia comments about the speakers or entertainers. Hot spot data mapping the speakers on the TV display can be downloaded with the TV program to the viewer's set top box. During the show, the viewer can click on one of the speakers, and the hot spot will trigger an interactive function, such as displaying the speaker's biography in a window, or send a vote supporting the speaker's viewpoint back to the show. If the set top box supports viewer input via a keyboard and has a modem connection, an on-line response can be sent by the viewer to the show.

As a further example, existing video content such as a music video can be enhanced with overlays of graphics, buttons, and other objects to be displayed, for example, as pop-up quotes or trivia questions or game-oriented graphics in conjunction with the music video. The overlays may be edited onto the original music video using standard multimedia or video editing tools, for example the Macromedia Director™ program. The enhanced TV content can then be rendered as an interactive TV program by mapping selected image and/or added (non-image) objects as hot spots, and transmitting the hot spot data to the viewer's set top box along with the enhanced TV content.

An example will now be described for implementing and using hot spots in an interactive TV program delivered as analog video signals through a conventional cable TV system. Referring to FIG. 7a, an example of an interactive TV program is shown displayed on a conventional TV set 70 connected by a conventional set top box 71 to a cable TV system. The set top box 71 has downloaded to it an interactive TV utility which consists of a defined set of functions that can be called to perform the various interactive functions of the interactive TV program. The interactive TV program consists of a background image B of a city from video footage content overlaid with buttons A1, A2, A3, A4, A5 representing game options for an interactive game to be played by the viewer in conjunction with the story conveyed by the background image. The available game option buttons may be identified visually for the viewer by a halo H displayed around the buttons.

Using a conventional TV remote control 73, the viewer selects one of the game options by toggling through them in sequence, for example, by pressing the "Select" key on the remote. As the viewer toggles through the options, the halo H is brightened, as shown with highlighted halo H' for button A5, in order to identify the currently toggled button for the viewer. The viewer can select a currently toggled button by pressing the "Enter" key, for example, on the remote. This may result, for example, in the viewer gaining a score assigned to that button. A tally of the viewer's score is maintained by the interactive TV utility executed by the processor in the set top box 71. After the game is completed, the viewer's total score is sent to the cable company's headend server, where it is recorded with the scores from other viewers on an output listing that is sent on to the sponsor of the interactive TV game. The sponsor can then send notification of a prize to the winner of the game.

Referring to FIG. 7b, the analog video signal for the interactive TV game is represented schematically as a series of video signal frames VIDEO in time-indexed order (t). Conventional TV signals are transmitted at the rate of 30 frames per second. In between the VIDEO frames are video blanking intervals VBI which can be used to transmit additional signals to the viewer's set top box. In this example, the background image of the city as video content are transmitted in the VIDEO frames, while the hot spot data identifying the positions of the available game option buttons A1, A2, A3, A4, A5 on the display are transmitted in the VBI along with the score to be gained in the instant game segment. The hot spot data may be in the form of coordinate locations of the buttons, with the halos being generated by the interactive TV utility stored with the set top box. Alternatively, the hot spots may be in the form of a graphic overlay of the halos in their respective positions, which are overlaid in the display of the TV content on the viewer's TV display.

The frames of analog video signals can be time-addressed using the SMPTE time code synchronization protocol widely used in the television and motion picture industry. SMPTE Time Code provides a unique time address for each frame of a video signal. This address is standardized as an eight-digit number based on the 24-hour clock in hours, minutes, and seconds and the video frame rate per second. There are four standard frame rates (frames per second) that apply to SMPTE Time Code: 24, 25, 30, and 30 "Drop Frame". SMPTE time code can be recorded as digital signals recorded longitudinally on a track of an audio or video tape or recording media, or can be encoded in the video signal frame-by-frame during the vertical blanking interval VBI between frames. If the SMPTE Time Code is not transmitted with the video signal, it can be supplied by the equipment that processes the received video signal which, in this case, is the interactive TV utility stored in the set top box.

The interactive TV program can thus be supplied through existing cable TV channels by sending the TV content in the VIDEO frames and the hot spot data and interactive functions data (indexed to SMPTE Time Code) in the VBI to the viewer's set top box. Alternatively, the entire game sequence of hot spot data and scoring data can be transmitted on the same cable channel prior to the interactive TV program, or on a separate channel or an available side band of the assigned cable TV spectrum. The interactive use of hot spots with analog cable TV signals on current cable equipment in widespread use may be limited to pop-up and other overlay effects, without being able to pause the TV content or bookmark the hot spots, since analog cable TV signals are broadcast as streaming, non-interruptible content.

The toggling function can be implemented with conventional cable TV set top boxes and remote controls in a manner similar to that currently used to display and control on-screen menus such as volume control, for example. The on-screen menu is downloaded to the set top box by the cable company as part of the subscriber's cable control package. When the viewer presses a volume control button on the remote control, the volume on-screen menu is displayed on the TV screen superimposed over the TV program currently being viewed. The usual volume control menu consists of a series of bar segments at fixed position intervals representing the volume level. As the viewer presses the volume-up or volume-down buttons, the display toggles through the bar segments in up or down sequence and highlights the currently toggled segment. In a similar manner, the hot spot objects can be overlaid with halos H and toggled through with highlighting by pressing the "Select" and "Enter" keys on the remote control.

The sponsor or producer of the interactive TV program may use the authoring system described above to generate the hot spot data and scoring functions when creating the enhanced TV content for the interactive TV game. As examples, pre-recorded sports programs, news telecasts, performance telecasts, TV commercials, product infomercials, etc. can be authored with hot spot data using the outlining and tracking functions described above for taped video frames in analog format. Since the hot spot data is maintained logically separate from the TV content, it does not matter what form, signal or file format the TV content is provided in or what set top box system or display platform it is run on. Therefore, the current diversity of sources for generating and distributing media content can continue to be utilized in conjunction with the authoring of interactive TV programs for delivery on conventional cable TV systems.

The viewer's interactive response may be sent back to the cable company's headend server using the conventional impulse store-forward function through the cable connection or through a separate telephone modem connection. Current cable TV equipment has the capability to store a token of data in the set top box memory, such as when a viewer accesses a pay-per-view channel, and to send the token of data along with the customer ID number as a transmitted signal on the cable conduit to the cable company's headend at predetermined times (called "impulse store-forward"). Other types of conventional TV equipment allow the customer to connect with the cable company or a third-party contractor through a modem coupled to a separate telephone line. Advanced digital set top boxes and cable TV network systems to be widely deployed in the future are expected to provide a greater bandwidth of two-way transmission through the cable connection for interactive TV applications.

Other Applications

The hot spot authoring of media content can also be extended to the mapping of objects in a virtual reality program. Conventional virtual reality programs are written as a single program encompassing all of its responsive effects. However, by using separate N Data mapping, a virtual reality program can be written with a media component for the scene presentation, and an IDM component which uses multi-use N Data generated for the media component to call up selected types of interactive responses when the player touches or points to an object appearing in the media component. For example, the media component can play the scene presentation of "Jurassic Park", while an educational IDM component can call up displays of information about various dinosaurs pointed to, or an action IDM component can call up an action response or scene changes when various dinosaurs are encountered. In this way, different types of interactive programs can be written using the same media component and N Data.

The recent development of high capacity digital video disks (DVDs) has made it possible to deliver movie-length programs in digital format on a disk of a comparable size as CD-ROMs. Recent acceptance of a standardized DVD format ensure that high-density DVDs can comfortably store two hours of MPEG-2 quality video within the 4.7 GB capacity of a single layer on a single side of the disk, compared to the traditional 680 MB capacity of the CD-ROM disk. The DVD format further provides the capability for dual-layer recording which almost doubles its storage capacity on a single side. The second disk layer may be read from either direction, i.e., inside-out or outside-in. Thus, interactive program data can be stored in the second layer in proximity to the media content stored in the first layer. The hot spot position data can be stored in an initial segment of the disk recording and read into the player control module at the beginning of playback. Thereafter, when the user clicks or points at a hot spot during playback of the media content, the DVD player need only refocus to the second layer of the disk in the same proximate position to read out the interactive program data applicable to the hot spot, thereby avoiding the need to delay the IDM sequence with seek time. The net result is instantaneous and seamless interactive play.

When media content is rendered interactive with an IDM program using "hot spot" position data, it may be desirable to stop, pause, rewind, or otherwise control the playback with familiar VCR-like controls to allow the user time to interact with the program, such as for reading information, making choices, inputting information, following a hyperlink from the hot spot, or saving a marked hot spot for later review. VCR-like controls have been developed for use with most types of multimedia systems. For example, in video-on-demand or media-on-demand systems, "streaming" content supplied in segments of digital data packets can be controlled with VCR-like controls by interrupting the content stream upon sending a command from the subscriber and rescheduling the sending of content segments as requested by the subscriber. Such video server scheduling techniques and handling of interactive requests from a video-on-demand network are described, for example, in U.S. Pat. No. 5,528,513 to Vaitzblit et al. for prioritizing streaming content tasks, U.S. Pat. No. 5,461,415 to Wolf et al. for grouping viewers in time to receive a common data stream and reserving a look-ahead data stream for a viewer sending a pause request, U.S. Pat. No. 5,453,779 for resuming transmission to a viewer based upon timed re-entry after the pause interval, and U.S. Pat. No. 5,442,390 for storing a current program segment in the viewer's console memory and using time-indexed pointers for handling VCR-like viewing functions from the console. For multimedia systems in which streaming content is supplied locally from a CD-ROM or DVD player, such VCR-like functions are handled locally with suitable player controls.

When a user clicks or points at a hot spot in streaming media content, it may be desirable to provide a "bookmark" or "frame storage" function so that the user can store the hot spot object for later review and follow up. For systems in which the media content is supplied locally from a disk or other multimedia player, a bookmark function can be implemented in accordance with known techniques for storing the address of the frame and the position of the hot spot pointed to by the user, for later playback and interactive use in accordance with the IDM program. For video-on-demand or media-on-demand systems, a frame storage function can be implemented with available video console memory to store the entire image frame and hot spot position in RAM for later playback and interactive use.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications, and applications, is defined in the following claims.

What is claimed is:

1. A system for allowing existing media content to be converted and used as an interactive media program comprising:

(a) existing media content in the form of media data representing a series of successive image display frames indexed in a time sequence which have objects appearing visually in one or more of the image display frames;

(b) object mapping data specifying display locations of the objects appearing in the image display frames of the existing media content which are to be rendered interactive;

(c) linkages provided through an associated object interactivity program for linking the objects specified by the object mapping data to respective interactive functions to be performed upon user selection of the objects by pointing to the display locations of the objects appearing in a display of the existing media content; and (d) a user system for operating the object interactivity program in conjunction with the display of the existing media content, said user system including a display device for receiving the media data and displaying the series of image display frames represented by the media data, an object interactivity device for receiving the object mapping data and the object interactivity program and performing the respective interactivity functions when objects appearing in the display of image display frames are selected by the user, and a pointing device for enabling the user to point to the display locations of objects appearing in the display of the media content, the user thereby being enabled to interactively select an object appearing in one or more image display frames by using said object mapping data specifying its display location in the image display frames and performing the interactive function linked by the corresponding linkage of the object interactivity program thereto, wherein the existing media content is an existing TV program transmitted to a viewer's TV set top box, the object mapping data correspond to the display locations of interactive objects appearing in the TV program and are transmitted to the viewer's set top box along with the object interactivity program and the viewer's set-top box is coupled to a television display and to a set top box remote control which is adapted as a pointer device.

2. A system according to claim 1, wherein the TV program is existing video content enhanced with overlays of graphics to be displayed as objects appearing in the display in conjunction with the existing video content.

3. A system according to claim 1, wherein the TV program is existing video content transmitted as analog TV signals constituted by video frame signals in a time-indexed sequence, and the object mapping data and object interactivity program are transmitted in video blanking intervals interleaved with the video frame signals.

4. A system according to claim 1, wherein the remote control for the set top box is adapted for pointing to an object by toggling through and selecting an object from a plurality of interactive objects displayed on the viewer's TV.

5. A system according to claim 4, wherein the set top box includes an interactive TV utility for generating markers at the display locations of interactive objects in the display of existing TV content as defined by the object mapping data and allowing the viewer to toggle through them.

6. A system according to claim 4, wherein the object mapping data are constituted by a display overlay of markers at display locations corresponding to interactive objects in the display of TV content, and the set top box includes an interactive TV utility for displaying the overlay of markers marking the interactive objects in conjunction with the display of TV content.

7. A system according to claim 4, wherein the set top box includes an interactive TV utility for generating highlights in succession at display locations corresponding to the interactive objects in the display of TV content as defined by the object mapping data, in response to the viewer's toggling through the interactive objects displayed on the viewer's TV.

8. A system according to claim 7, wherein the interactive TV utility includes a function for performing an object interactivity linkage function in response to the viewer's selection of an object defined by the object mapping data, and storing the output of the performed functions with the set top box.

9. An authoring system for allowing existing media content to be converted and used as an interactive media program comprising:
  (a) an editing subsystem for editing existing media content in the form of media data representing a series of successive image display frames indexed in a time sequence which have objects appearing visually in one or more of the image display frames;
  (b) an object mapping subsystem for generating object mapping data specifying display locations of the objects appearing in the image display frames of the existing media content which are to be rendered interactive;
  (c) object interactivity program development tools including a hyperlinking tool for establishing linkages from the objects specified by the object mapping data to respective interactive functions to be performed upon user selection of the objects in conjunction with a display of the existing media content; and
  (d) said object mapping subsystem having an object mapping tool for defining the display location of an object appearing in a display frame of the existing media content which is to be rendered interactive by marking the display location position of the object as it appears in an image display frame,
  wherein said object mapping subsystem includes an object outlining tool for generating object mapping data specifying the display location of an object appearing in a display frame of the existing media content based upon an outline drawn around the object with a cursor or pointing device.

10. An authoring system according to claim 9, wherein said object mapping subsystem further includes an object motion tracking tool for detecting a path of an object as it appears in motion across a series of display frames and for generating object mapping data for the object for the series of display frames based upon an outline drawn around an object in one display frame by said object outlining tool and the path of motion of the object detected by said object motion tracking tool.

11. A method for allowing existing media content to be converted and used as an interactive media program comprising the steps of:
  (a) providing existing media content in the form of media data representing a series of successive image display frames indexed in a time sequence which have objects appearing visually in one or more of the image display frames;
  (b) defining object mapping data specifying display locations of the objects appearing in the image display frames of the existing media content which are to be rendered interactive;
  (c) defining linkages provided through an associated object interactivity program for linking the objects specified by the object mapping data to respective interactive functions to be performed upon user selection of the objects by pointing to the display locations of the objects appearing in a display of the existing media content; and
  (d) operating an interactive media program on a user system in conjunction with the display of the existing media content by receiving the media data and displaying the series of image display frames represented by the media data, receiving the object mapping data and the object interactivity program and performing the respective interactivity functions when objects appearing in the display of image display frames are selected by the user, and enabling the user to point to the display locations of objects appearing in the display of the media content in order to interactively select an object appearing in one or more image display frames using said object mapping data specifying its display location in the image display frames and performing the interactive function linked by the corresponding linkage of the object interactivity program thereto,
  wherein the existing media content is an existing TV program transmitted to a viewer's TV set top box, the object mapping data correspond to the display locations of interactive objects appearing in the TV program and are transmitted to the viewer's set top box along with the object interactivity program, and the viewer's set-top box is coupled to a television display and to a set top box remote control which is adapted as a pointer device.

12. A method according to claim 11, wherein the TV program is existing video content enhanced with overlays of graphics to be displayed as objects appearing in the display in conjunction with the existing video content.

13. A method according to claim 11, wherein the TV program is existing video content transmitted as analog TV signals constituted by video frame signals in a time-indexed sequence, and the object mapping data and object interactivity program are transmitted in video blanking intervals interleaved with the video frame signals.

14. A method according to claim 11, wherein the remote control for the set top box is adapted for pointing to an object by toggling through and selecting an object from a plurality of interactive objects displayed on the viewer's TV.

15. A method according to claim 1, wherein the set top box includes an interactive TV utility having a function for generating markers at the display locations of interactive objects in the display of existing TV content as defined by the object mapping data and allowing the viewer to toggle through them.

16. A method according to claim 1, wherein the object mapping data are constituted by a display overlay of markers at display locations corresponding to interactive objects in the display of TV content, and the set top box includes an interactive TV utility for displaying the overlay of markers marking the interactive objects in conjunction with the display of TV content.

* * * * *